US006226004B1

(12) United States Patent
Nishihara

(10) Patent No.: US 6,226,004 B1
(45) Date of Patent: *May 1, 2001

(54) MODELING SYSTEM USING SURFACE PATTERNS AND GEOMETRIC RELATIONSHIPS

(75) Inventor: H. Keith Nishihara, Los Altos, CA (US)

(73) Assignee: Autodesk, Inc., San Rafael, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/928,200

(22) Filed: Sep. 12, 1997

(51) Int. Cl.$^7$ ............................. G06T 17/00; G06T 11/40
(52) U.S. Cl. ............................................ 345/420; 345/429
(58) Field of Search ...................................... 345/419, 420, 345/429

(56) References Cited

U.S. PATENT DOCUMENTS

| | | | |
|---|---|---|---|
| 5,255,352 | 10/1993 | Falk | 395/125 |
| 5,268,997 | * 12/1993 | Funaki | 345/427 |
| 5,497,452 | 3/1996 | Shimizu et al. | 395/120 |
| 5,511,153 | 4/1996 | Azarbayejani et al. | 395/119 |
| 5,617,510 | 4/1997 | Keyrouz et al. | 395/10 |
| 5,633,995 | 5/1997 | McClain | 395/119 |
| 5,784,063 | * 7/1998 | Nagakura et al. | 345/420 |
| 5,903,270 | * 5/1999 | Gentry | 345/419 |

OTHER PUBLICATIONS

Becker, S. et al., "Semiautomatic 3–D model extraction from uncalibrated 2–D camera views", MIT Media Laboratory, Proceedings of the SPIE—The International Society for Optical Engineering Conference, vol. 2410, (1995) 15 pages.

Debevec, P. et al., "Modeling and Rendering Architecture from Photographs: A hybrid geometry– and image–based approach", Technical Report UCB//CSD–96–893, Univ. of Cal. at Berkeley, Jan. 1996, pp. 1–33.

* cited by examiner

*Primary Examiner*—Matthew Luu
*Assistant Examiner*—Chanté Harrison
(74) *Attorney, Agent, or Firm*—Wilson Sonsini Goodrich & Rosati

(57) ABSTRACT

Method for creating a three dimensional model of a scene based on a two dimensional image of the scene. The method includes identifying a plurality of surfaces in the image, identifying a plurality of constraints between the surfaces in the image, identifying a pattern on a first surface in the image, identifying a first constraint between the pattern and another feature of the image, and generating a three dimensional model of the scene based on the surfaces, the plurality of constraints, and the first constraint. The pattern may include a grout line in a tile surface or an identifying mark on a wall paper.

40 Claims, 13 Drawing Sheets

Overview

Vanishing Point Analysis

Internal Camera Parameters

-focal length
-image center

External Camera Parameters

Camera Solver

MODELING SYSTEM USING SURFACE PATTERNS AND GEOMETRIC RELATIONSHIPS

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patents files or records, but otherwise reserves all copyright rights whatsoever.

BACKGROUND OF THE INVENTION

1. Field of the Invention

The present invention relates to the field of three dimensional modeling; and more particularly to the creation of three dimensional models from a two dimensional image.

2. Description of Related Art

Researchers have attempted to create three dimensional models of scenes based on two dimensional photographs. The resulting model helps to provide virtual environments or valuable visualization tools.

Some prior techniques have used architectural plans, CAD designs, and other human input. Such creation of three dimensional models can be expensive and time consuming. Further, such computer generated models may not accurately reflect the look of the scene which is being modeled.

Attempts have been made to create models from two dimensional photographs. Some such techniques use stereo computational techniques based on multiple images of the scene to be modeled. Such techniques require more than one photograph of the scene to be modeled.

One modeling system is described in an article entitled "Modeling and Rendering Architecture From Photographs: A Hybrid Geometry- and Image-Based Approach," Technical Report UCB//csd-96-893, Jan. 19, 1996 by P. Debevec, C. Taylor, J. Malik. Another approach is described in "Semi-automatic 3-D Model Extraction From Uncalibrated 2-D Camera Views," MIT Media Laboratory by S. Becker and V. Bove.

"Constraints" are relationships between aspects of items in a scene, such as a parallel relationship between surfaces. Using constraints, researchers have attempted to solve for three dimensional models of scenes.

One method for extracting a three dimensional model of an object based on image data is described in U.S. Pat. No. 5,633,995 by McClain. In McClain, multiple cameras are shown to acquire information about a scene.

One problem encountered in three dimensional modeling from two dimensional photographs relates to distortion in the image due to a camera's characteristics.

A photograph from which a model is to be created may lack significant indications of physical structure that would allow a three dimensional model to be easily created from the photograph. There may be a lack of sufficient number of surfaces visible that have knowable orientations and inter-connectivity relationships. Such an under-constrained situation may lead to solutions for the camera model and scene model that may be consistent with the available data but which yield some aspects that may not appear correct to a human observer.

Even in over-constrained cases, errors in the determination of image positions, as well as errors in the constraints supplied, may lead to a solution that yields an image that does not appear perfectly accurate.

Prior techniques of creating three dimensional models have the disadvantage of requiring extensive information about scene geometry that may not be available in the images provided. Further, using models created by prior techniques, resulting projections of images may not appear correct. Thus, there is a need for an improved method of creation of three dimensional models.

SUMMARY OF THE INVENTION

One embodiment of the invention includes a method of creating a three dimensional model of a scene based on a two dimensional image of the scene. The method includes identifying a plurality of surfaces in the image, identifying a plurality of constraints between the surfaces in the image, identifying a pattern on a first surface in the image, identifying a identifying a first constraint between the pattern and another feature of the image, and generating a three dimensional model of the scene based on the surfaces, the plurality of constraints, and the first constraint.

In one embodiment of the invention, the pattern includes a grout line in a tile surface. Alternatively, the pattern may include, for example, a mark on a wall paper. Identifying a plurality of surfaces in the image may include drawing lines on an image, the lines corresponding to edges of a surface. In one embodiment the another feature includes a surface; in another embodiment it comprises a second pattern. In one embodiment, the plurality of constraints includes a parallel relationship; in another embodiment the plurality of constraints includes a perpendicular relationship.

DETAILED DESCRIPTION

One embodiment of the invention provides a method and system for creating a three dimensional model from a two dimensional image. In this embodiment, the three dimensional model can be viewed from various perspectives, for example, in a walk-around viewer. The three dimensional model can be reprojected as a two dimensional image. Modifications can be made to the image, such as the replacement of surface patterns. For example, a new wall paper may be added to the wall or a new tile may be added to the floor. The user enters constraints on the orientations of surfaces in the scene, such as the perpendicular relationship between the floor and a wall. Additionally, the user enters constraints on surface patterns. For example, the user may enter the constraint of grout lines between tiles on the floor being parallel to the wall or to other grout lines. Based on the various constraints, the system solves for a three dimensional model of the scene. Using the orientation of surface patterns in the creation of the model helps to improve the look of patterns on images created from the model, especially with respect to alignment and distortion.

System Overview

Figure 1:
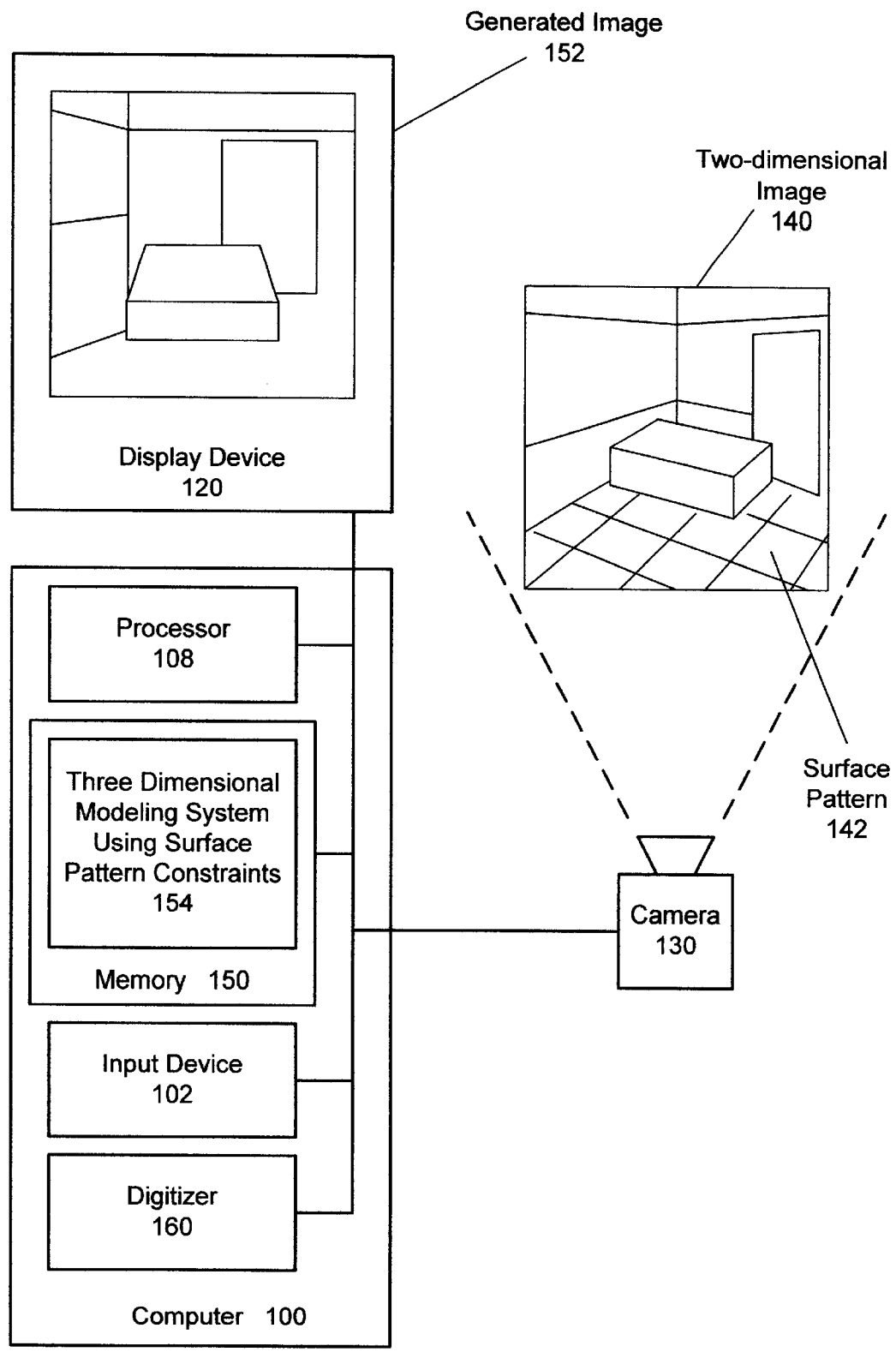
FIG. 1 shows a computer controlled three dimensional modeling system according to an embodiment of the invention.

FIG. 1 shows a computer controlled three dimensional modeling system according to an embodiment of the present invention. FIG. 1 shows a two dimensional image 140, a camera 130, a computer 100, and a display device 120. The two dimensional image 140 includes a surface pattern 142. The camera 130 is coupled to computer 100. The computer 100 includes a processor 108, a memory 150, an input device 102, and a digitizer 160. The computer 100 is coupled to display device 120. Display device 120 includes a generated image 152. Memory 150 includes three dimensional modeling using surface pattern constraints 154.

Camera 130 is used to acquire the two dimensional image 140, which includes surface pattern 142. Computer 100 processes the image 140 to create a three dimensional model. Input device 102 allows a user to control computer 100. Digitizer 160 allows for digitization of an analog image acquired by camera 130. Processor 108 controls computer 100. Based on a three dimensional model created by computer 100, a generated image 152 can be displayed on display device 120. Generated image 152 may be from a different perspective than two dimensional image 140. This is possible since two dimensional image 140 is created from the three dimensional model. The three dimensional modeling using surface pattern constraints 154 uses constraints with respect to surface pattern 142 in the creation of the three dimensional model. Computer code for causing the computer to process an image may be stored on a computer usable medium. The computer usable medium may comprise a floppy disk, a hard disk, a laser disk, a memory, or a transmission medium such as a network, cable, or computer bus.

In other embodiments, camera 130 is a digital camera, or alternatively an analog camera. A still camera or video or other camera may be used. Further, a scanner or other device for obtaining images may be used. An image may also be obtained digitally, for example, directly over a network, from a computer disk, or from a memory location. In other embodiment, a dedicated computer is used to process information, or alternatively, a general purpose computer running software is used. Also, a distributed system with various components throughout a network may be used for processing. Embodiments of the system include software products to be used on general purpose computers and, alternatively, specialized systems dedicated to image processing and three dimensional modeling.

Flow Overview

Figure 2:
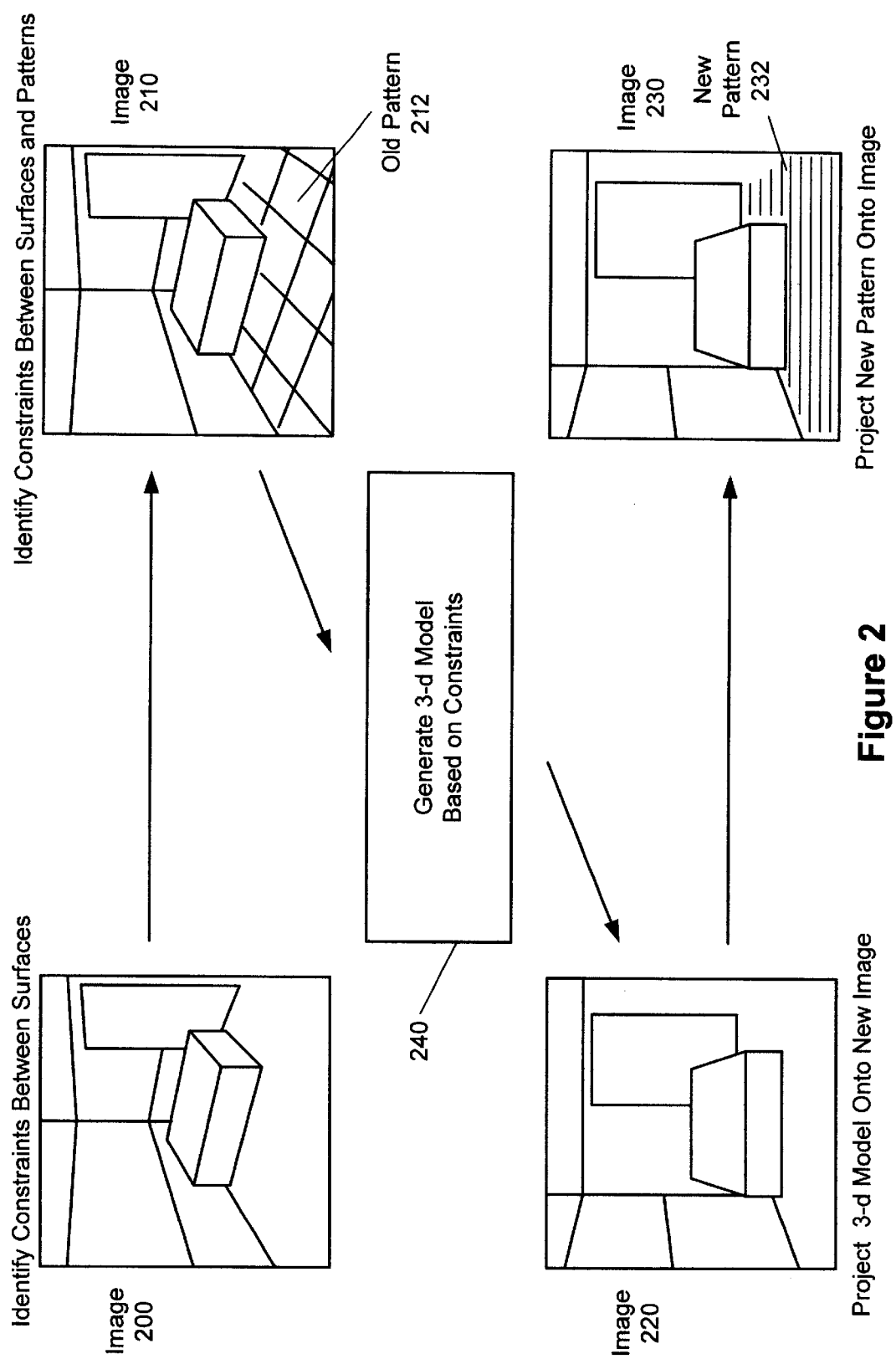
FIG. 2 shows a process flow for generation of a three dimensional model based on geometric relationships using surface patterns according to an embodiment of the invention.

FIG. 2 shows a process flow for generation of a three dimensional model based on constraints using surface patterns according to an embodiment of the present invention. FIG. 2 includes image 200 with constraints between surfaces identified, image 210 with constraints between surfaces and patterns identified, image 220 with a projected 3D model onto a new image, and image 230 with a projected new pattern onto the image.

The system as shown in FIG. 2 operates as follows. First, as shown in image 200, the user identifies surfaces in the image 200 and identifies constraints between the surfaces. Image 210 includes old pattern 212 from which constraints are obtained. Old pattern 212 is the pattern originally in image 200, but is not shown in image 200, because the user has not yet identified pattern 212. The user identifies constraints between surfaces and old pattern 212.

Next, a three dimensional model is generated based on the constraints (block 240). This model is based the constraints with respect to the patterns as well as the constraints with respect to surfaces. Next, as shown with image 220, the three dimensional model may be projected onto a new image. Given the new model, a new pattern 232 can be projected onto the image as shown in image 230. Although new pattern 232 is shown projected onto image 230, it is not necessary to project a pattern onto image 230. Also old pattern 212 can be some type of mark rather than a repeating pattern.

Model Creation Flow

Figure 3:
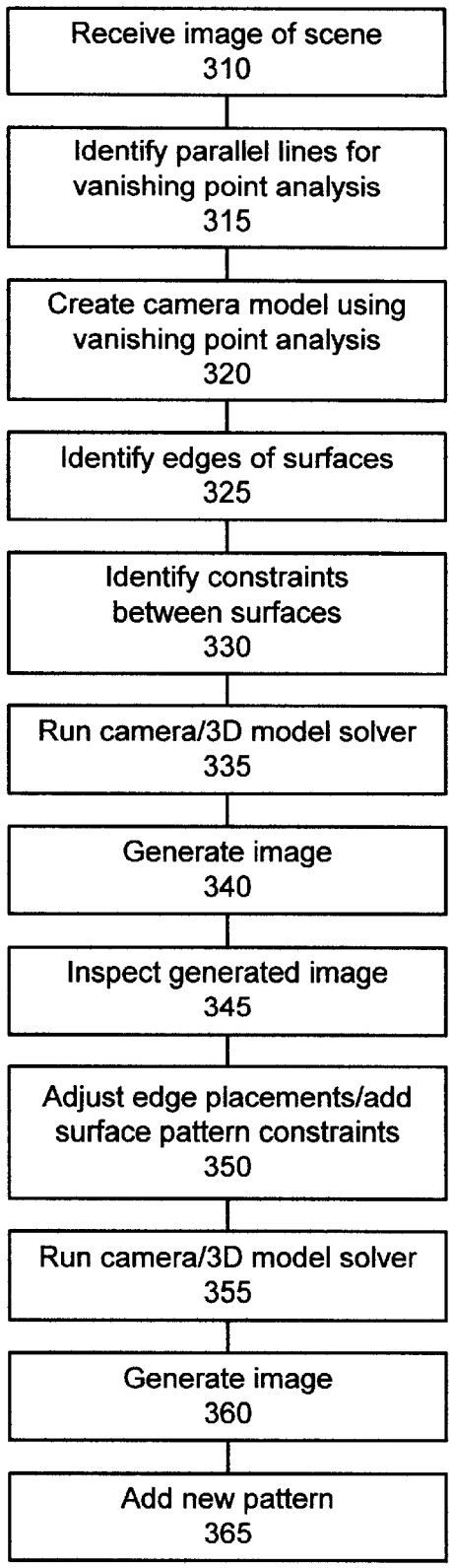
FIG. 3 shows a flow chart of the creation of a three dimensional model using surface patterns according to an embodiment of the invention.

FIG. 3 shows a flow chart of the creation of a three dimensional model using surface patterns according to an embodiment of the present invention. As shown in FIG. 3, a model may be preliminarily generated without the use of surface patterns as constraints. Later, surface patterns can be added as constraints to improve the resulting three dimensional model. First, a two dimensional image of a scene is received (block 310). The user identifies parallel lines in the scene which can be used for a vanishing point analysis (block 315). The system creates a camera model using vanishing point analysis and the parallel lines identified by the user (block 320). Next, the user identifies edges of surfaces in the image (block 325). The user identifies constraints between the surfaces (block 330). For example, the user may identify that a floor is an up-down surface and that the floor is perpendicular to a wall and that the floor is parallel to a countertop. Next, the system runs a camera solver (block 335). A three dimensional model results. Based on the three dimensional model, the system generates an image (block 340).

The user may then inspect the generated image (block 345). Based on the generated image, the user can adjust the placement of edges within the image to correct for errors that the user sees in the image. Further, the user identifies constraints between surface patterns and surfaces or other aspects of the images (block 350). For example, the user may indicate that a grout line is parallel to a wall, or that a wallpaper pattern is perpendicular to a floor. Based on the adjusted constraints and the new constraints with respect to surface patterns, the system again runs the camera solver (block 355). Based on the generated three dimensional model generated by the camera solver the system generates a new two dimensional image (block 360). Based on user input, a new surface pattern may be added to a surface in the image (block 365). The resulting three dimensional model and projected pattern is improved because the surface patterns were made an explicit constraint. The surface patterns, if not properly aligned in a resulting model and projection, may appear incorrect to a user. The addition of surface patterns as an explicit constraint helps to improve such projections and models.

User Interface with Lines for Vanishing Point Analysis

Figure 4:
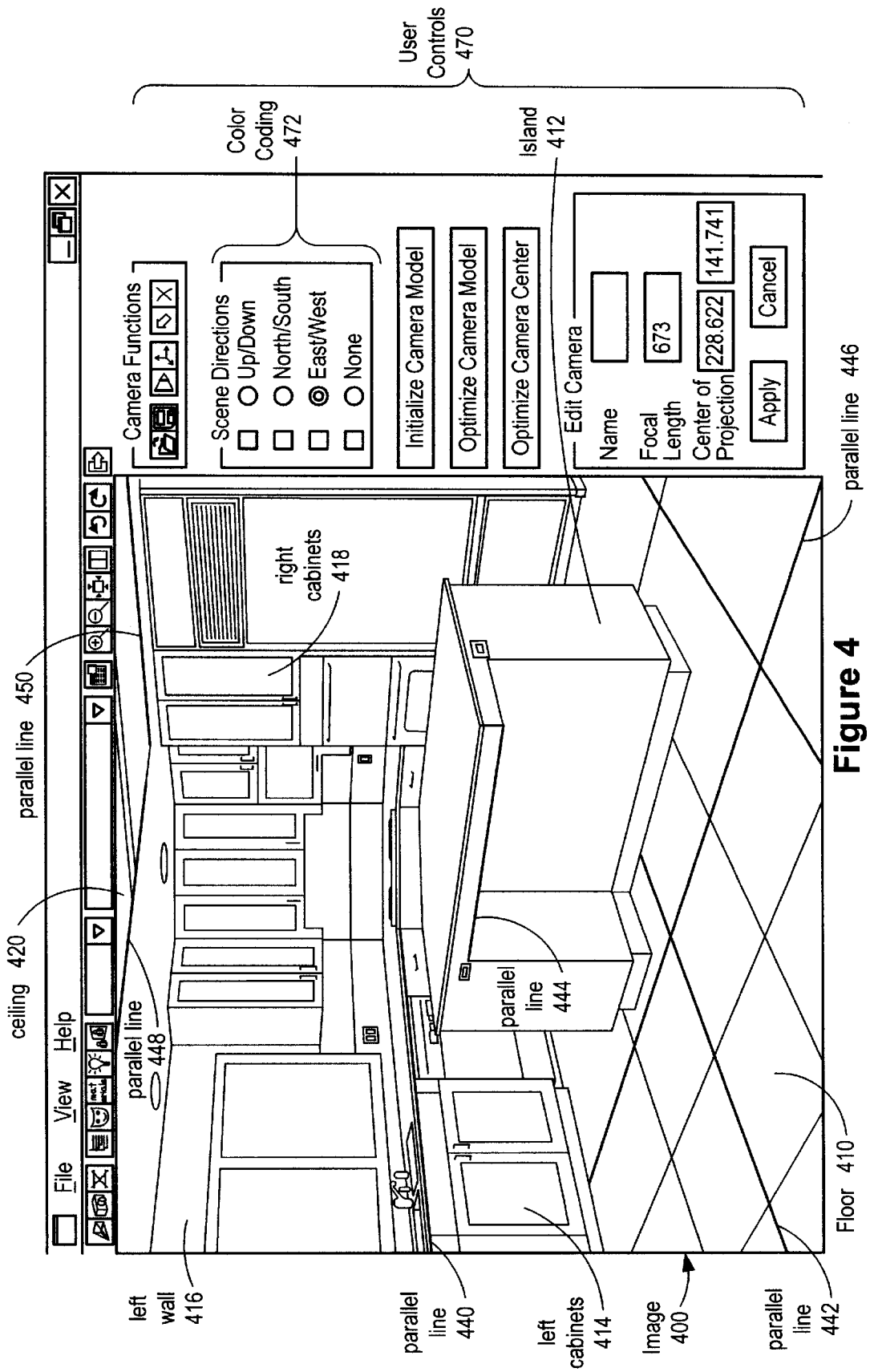
FIG. 4 shows a user interface with an image of a scene with vanishing point parallel lines according to an embodiment of the present invention.

FIG. 4 shows a user interface with an image of a scene with vanishing point parallel lines according to an embodiment of the present invention. FIG. 4 includes an image 400 and user controls 470. The image 400 includes a floor 410, an island 412, left cabinets 414, a left wall 416, right cabinets 418, and a ceiling 420. As shown in FIG. 4, various parallel lines (440, 442, 444, 446, 448, and 450) have been identified. The user identifies the parallel lines, and they will serve as inputs to a vanishing point analysis. The user identifies two or three sets of mutually orthogonal lines for the vanishing point analysis. Each set of parallel lines includes two or more parallel lines. Ideally, the user selects relatively long lines that are separated by a significant portion of the image's width. For example, line 444, line 446 and line 450 are parallel, and these lines would serve as a set of parallel lines. Also, lines 440, 442, and 448 are parallel and these lines would serve as a set of parallel lines. The first set of lines including lines 444, 446, and 450 are orthogonal to the second set of lines including line 440, 442, and 448. The user identifies these lines as parallel and orthogonal, respectively. The system then solves for vanishing points based on these lines. The user selects a parallel line by tracing the parallel line on the user interface, and indicating on the user interface that the line is parallel to other lines on the user interface.

Vanishing Point Analysis

Figure 5:
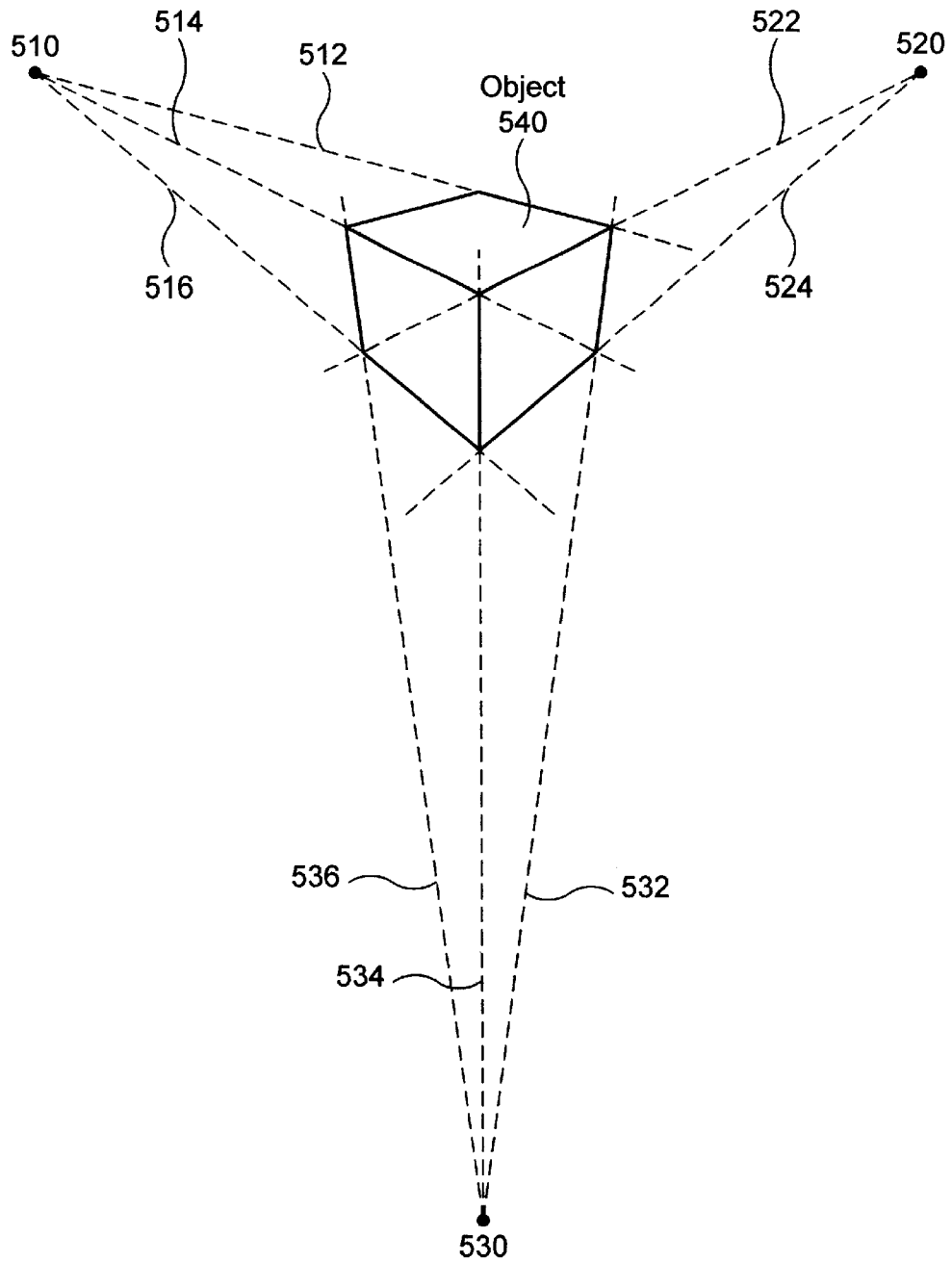
FIG. 5 is a schematic representation of vanishing point analysis.

FIG. 5 is a schematic representation of vanishing point analysis. FIG. 5 includes object 540 from a scene such as image 400. A first set of parallel lines including lines 512, 514, and 516 end in vanishing point 510. These lines (512, 514, and 516) represent parallel portions of object 540. These lines appear to vanish at the vanishing point 510. Also shown in FIG. 5 is a second set of parallel lines 522 and 524, which are orthogonal to the first set. These lines (522 and 524) meet at vanishing point 520. Similarly a third set of mutually parallel lines (532, 534, and 536) are orthogonal to the first set and the second set. This third set of parallel lines ends at vanishing point 530. FIG. 5 illustrates geometrically the analysis that takes place to determine vanishing points as for the parallel lines marked in FIG. 4.

Based on the vanishing points, the system computes estimates of camera focal length and three dimensional orientation of three scene directions associated with the detected vanishing points. This vanishing point analysis is used to create a first estimate of the camera model.

The system may create a camera model in ways other than through a vanishing point analysis. For example, the system may include a menu with a set of cubes, the cubes in different orientations. From the menu, the user may select a cube that is oriented closest to what the user perceives as the orientation of the scene. The system then uses the user's selection to help construct a camera model.

Internal Camera Parameters

Figure 6:
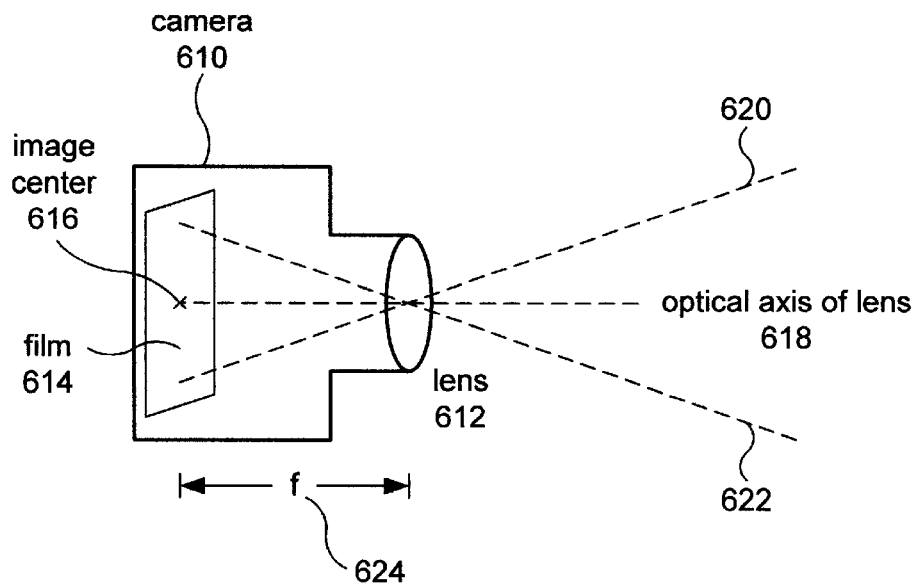
FIG. 6 illustrates internal camera parameters according to an embodiment of the invention.
Figure 6:
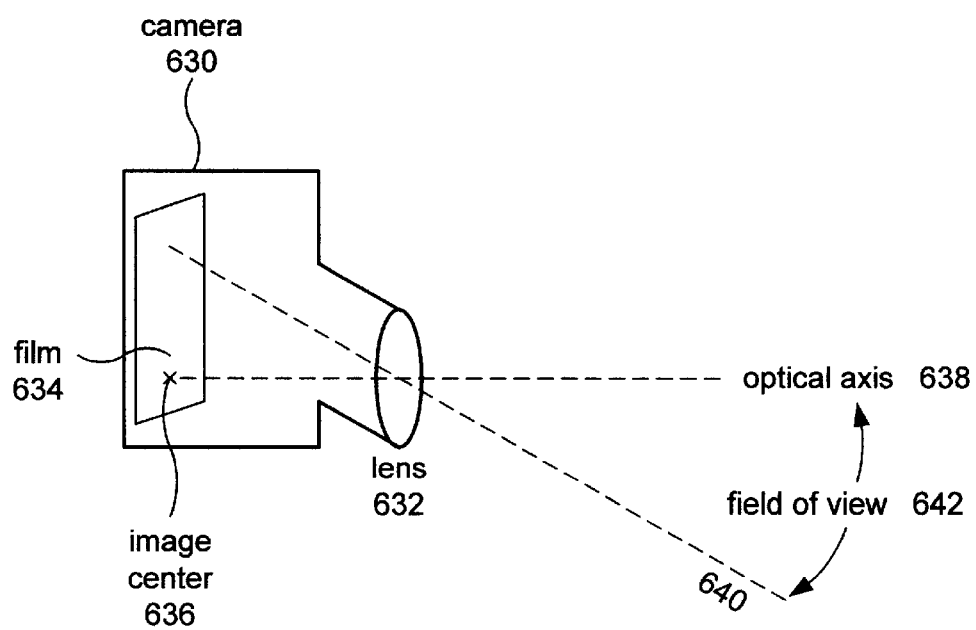

FIG. 6 illustrates internal camera parameters according to an embodiment of the invention. FIG. 6 includes camera 610 with lens 612, film 614, and optical axis of lens 618. Film 614 includes image center 616 which corresponds to the end of the optical axis 618 of the lens 612. Ray 620 and ray 622 intersect the lower and upper portion of the film 614 respectively. Focal length 624 defines the distance between lens 612 and film 614.

FIG. 6 also includes camera 630, in which the image center 636 is offset, such as may be the case in a photograph taken from an architectural camera. Optical axis 638 intersects image center 636 and film 634. Image center 636 is displaced from the center of film 634. Field of view 642 is defined by ray 640 and optical axis 638 through lens 632 in this camera 630.

External Camera Parameters

Figure 7:
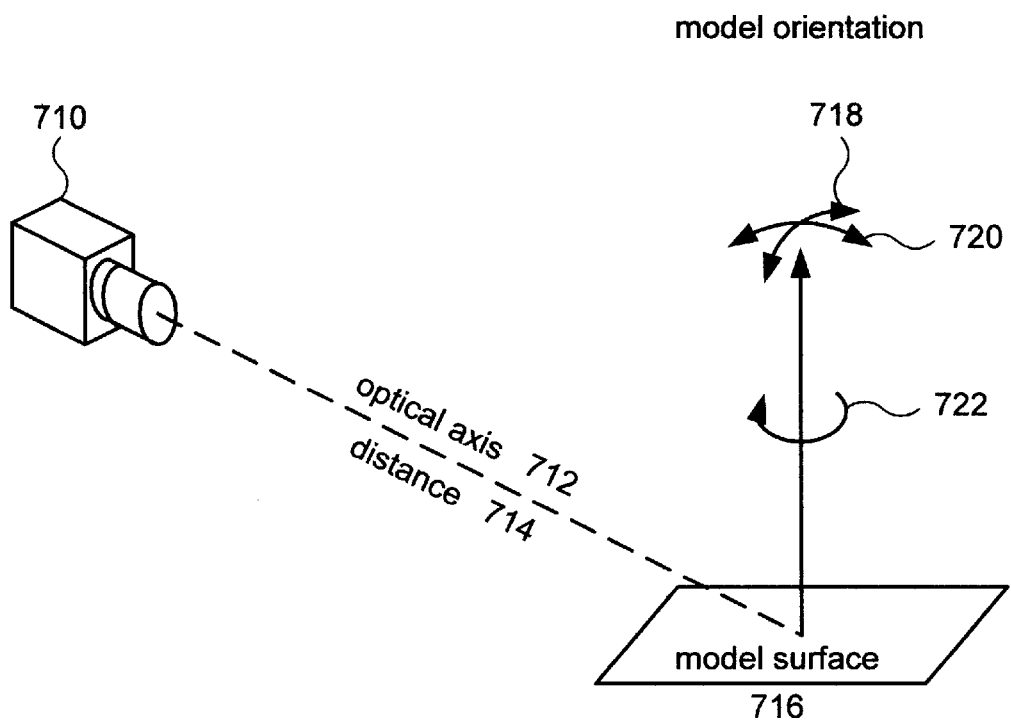
FIG. 7 is a schematic illustration of external camera parameters.

FIG. 7 is a schematic illustration of external camera parameters. External camera parameters include distance 714 between camera 710 and model surface 716, a rotational orientation 722 of model surface 716, and rotational degrees of freedom 718 and 720. Based on constraints and vanishing point analysis, the system solves for both the internal camera parameters and external camera parameters.

Partial Segmentation

Figure 8:
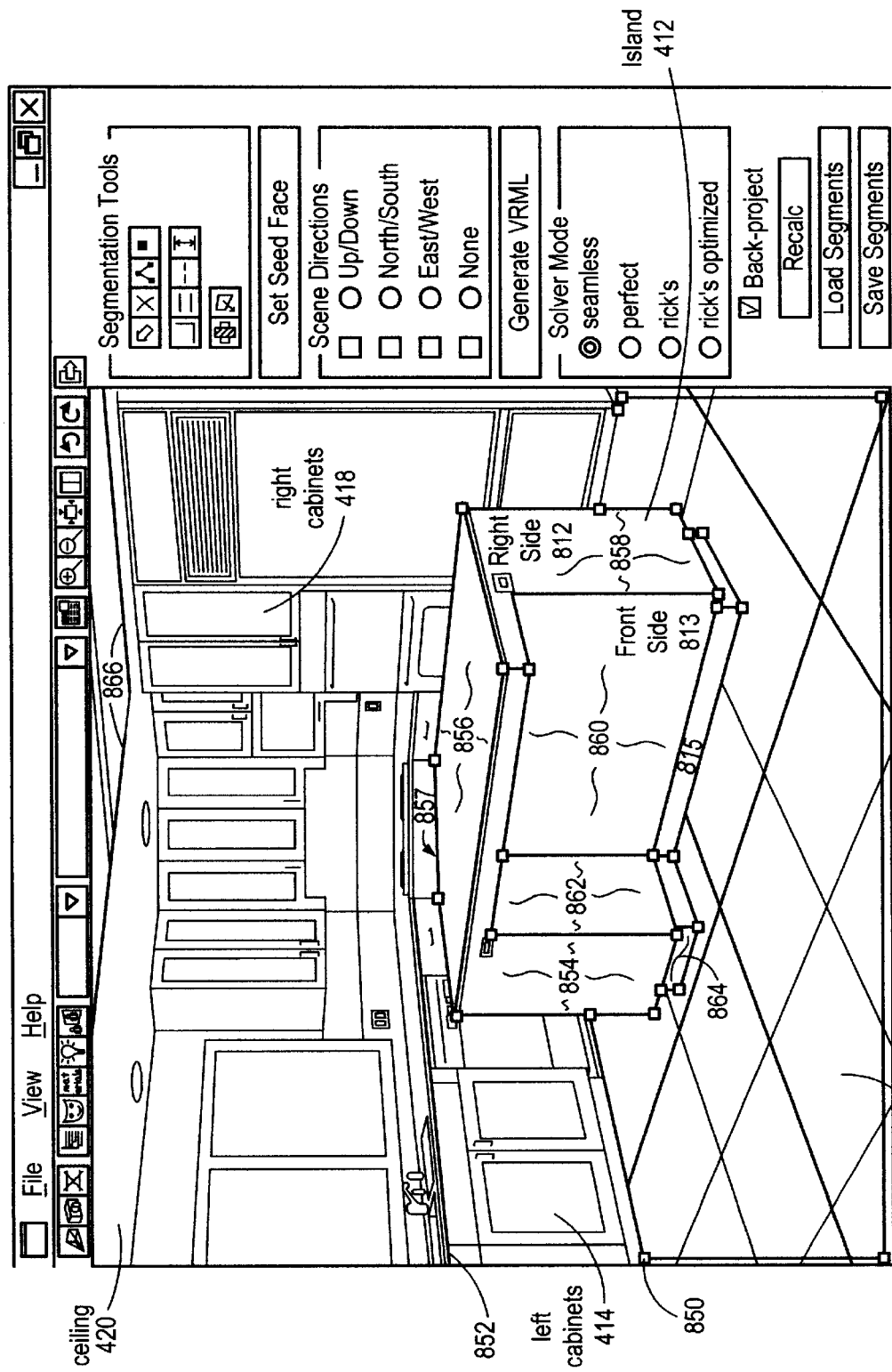
FIG. 8 illustrates a user interface with an image of the scene with partially segmented surfaces.

FIG. 8 illustrates a user interface with an image of the scene with partially segmented surfaces. In FIG. 8 the various lines have been drawn to designate the edges of surfaces in the image. The user draws these lines using a pointing device such as a mouse. The user then designates constraints between the surfaces after the edges of the surfaces have been defined. Segmentation lines 860 define a portion of the island in the middle of floor 410. Similarly, segmentation lines 854, 856, 858, 862 and 864 define surfaces of island 412. A user after designating edges of surfaces, may also designate constraints between surfaces. For example, the user may designate that right side 812 of island 412 is perpendicular to front side 813 of island 412.

The constraints include the aspect ratio of the surface. For example, the length to width ratio of a rectangular polygon. Observance of such constraints help to cause, for example, a pattern with square tiles to remap correctly onto the surface as square tiles.

Additional segmentation lines help to define other surfaces in FIG. 8. For example, segmentation lines 850 and 852 help to define left cabinets 414. Segmentation lines 866 help to define portions of ceiling 420.

The user should concentrate primarily on large orthogonal surfaces in the image which have visible junctions in the drawing of segmentation lines. The user also should identify occluding boundaries between surfaces. For example, segmentation line 857 between island 412 and left cabinets 414 is an occluding boundary, because at that boundary, island 412 begins to occlude the view of left cabinets 414.

Constraints added by the user include parallel or perpendicular relationships between surfaces. The user may also give information such as distances between surfaces. This information helps to solve for the three dimensional geometry of the seam based on the constraints and the two dimensional photograph. For example, if a surface shares an edge with a known surface and the angle between those surfaces is known, then the three dimensional geometry of the first surface can be attempted to be solved for since its position at the intersecting edge is known and its orientation about that edge can be computed from the orientation of the other face.

In some cases a surface has no direct contact with other surfaces that have no geometry. For example, in FIG. 8 island 412 has occluding boundaries all around it. In particular, the connection between toe kick 815 and island 412 is blocked by island 412. This makes the propagation of geometry up from the floor onto island 412 difficult. Therefore, a distance constraint between the parallel surfaces of toe kick 815 and island 812 is used to help solve for geometry of island 412 and toe kick 815.

Additionally, in many scenes of an architectural environment such as the one illustrated here, they may be predominantly three surface orientations: horizontal surfaces like the floor 410 and the ceiling 420, and orthogonal vertical surfaces such as the sides of the island 412 or left cabinets 414 and right cabinets 418. The user interface allows the user to directly indicate planar surfaces through using these scene directions. This scene direction information is then used to automatically generate surface to surface constraint information with other surfaces having scene directions.

For each of the surfaces identified by the user, the system determines whether there are sufficient constraints entered as of yet to yield a sufficient three dimensional model that will allow faithfully remapped surface patterns on the surface. The system determines whether:

a. There are constraints on the orientation of each edge of the surface relative to the other edges. Such constraints may be difficult to determine when one side of a surface is a occluded by another object or by the camera frame.
 b. The constraints on the aspect ratio of the surface. For example, the length to width ratio of a rectangular polygon. Observance of such constraints help to cause for example a pattern with square tiles to remap correctly onto the surface as square tiles.

Camera Solver Flow

Figure 9:
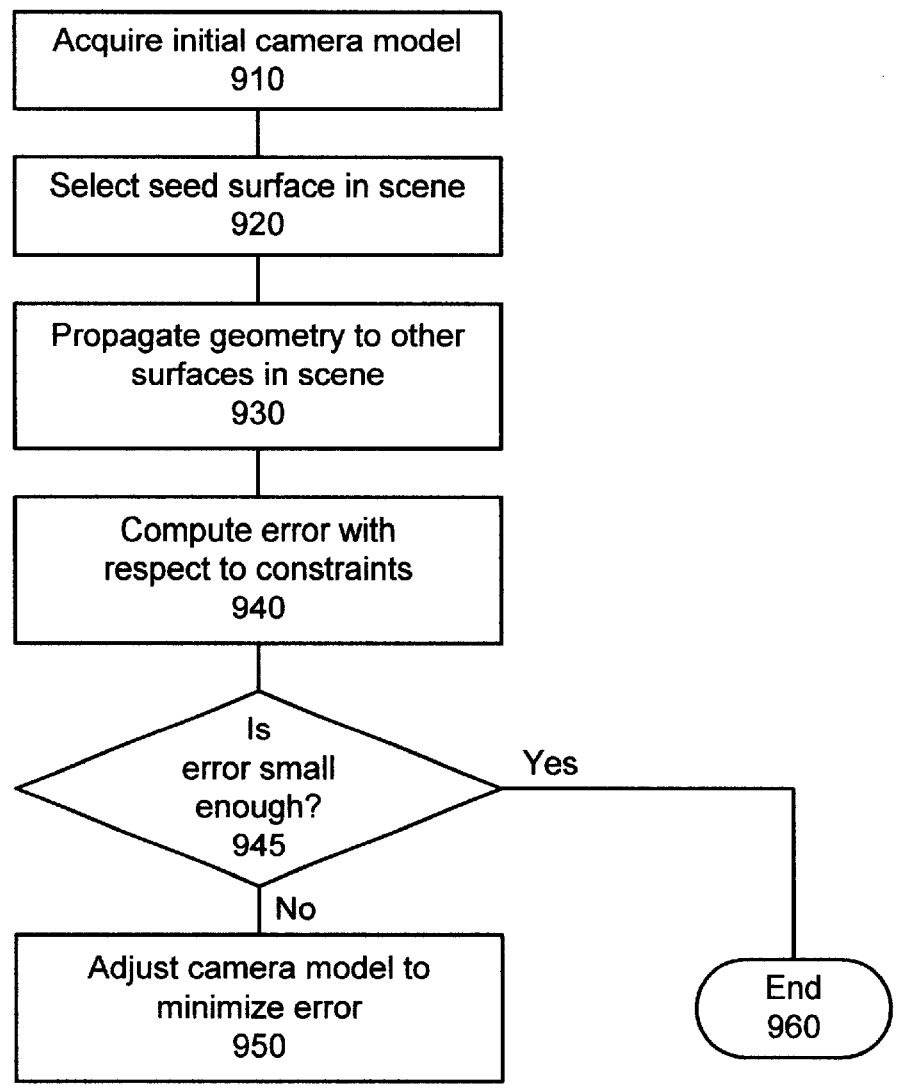
FIG. 9 shows a flow chart for a camera solver.

FIG. 9 shows a flow chart for a camera solver. First, the initial camera model is acquired (block 910). The user selects a seed surface in the scene (block 920). A three dimensional representation of the seed surface is created based on the camera model and the relationship between the seed surface and the camera. The three dimensional representation can be in the form of a three dimensional vector, representing a plane equation. Next, the geometry is propagated to other surfaces in this scene (block 930). For example, based on the representation of the seed surface, for example, the floor 410, the geometry of the left cabinets 414 is determined based on the constraint that the left cabinet is perpendicular to the floor and is located at a particular point on the floor. This process is continued with other surfaces in the scene so as to create three dimensional representations of the various surfaces of the scene. Next, errors are computed with respect to constraints (block 940). If the error is small enough (block 945), retain and use the camera model (block 960). If the error is not small enough (block 945), proceed to adjust the camera model to minimize error (block 950). For example geometry may have been propagated from floor 410 to left cabinets 414, to right cabinets 418. In this situation, the constraint regarding the relationship between right cabinets 418 and floor 410 may not have been fully fulfilled. This is an error in the resulting three dimensional model. The camera model is then adjusted to minimize such errors (block 950). The system retains a history of which direction of changes produce improvements in the camera model and adjust the camera model accordingly in block 950.

Different weights are given to different constraints so that when the camera model is adjusted to minimize errors certain constraints will be emphasized over others. For example, the alignment of surface patterns could be given a greater weight than other constraints. Alternatively, the constraint of distance may be given less emphasis than the constraint of perpendicularity since a distance constraint may not have been estimated correctly by the user.

In order to increase performance, the system uses only a subset of all the available constraints to derive the geometry when starting out from the seed face. The system uses the same orientation for all faces having the same associated scene orientation. All of the explicit constraints added to the model are then used to evaluate the quality of a given camera model. In addition, the degree to which intersecting surfaces actually meet in alignment with the image segmentation edges is assessed in adjusting the camera model to minimize error. Next, when the three dimensional model is generated, the user inspects the resulting model in a browser or in the projection of the model onto a two dimensional image. The user can then adjust placement of the segmentation edges and constraints and repeat running the camera solver.

For a description of techniques of solving a system based on constraints, please refer to U.S. Pat. No. 5,617,510 by Keyrouz et al., which is incorporated herein by reference in its entirety.

User Interface with Marked Surface Patterns

Figure 10:
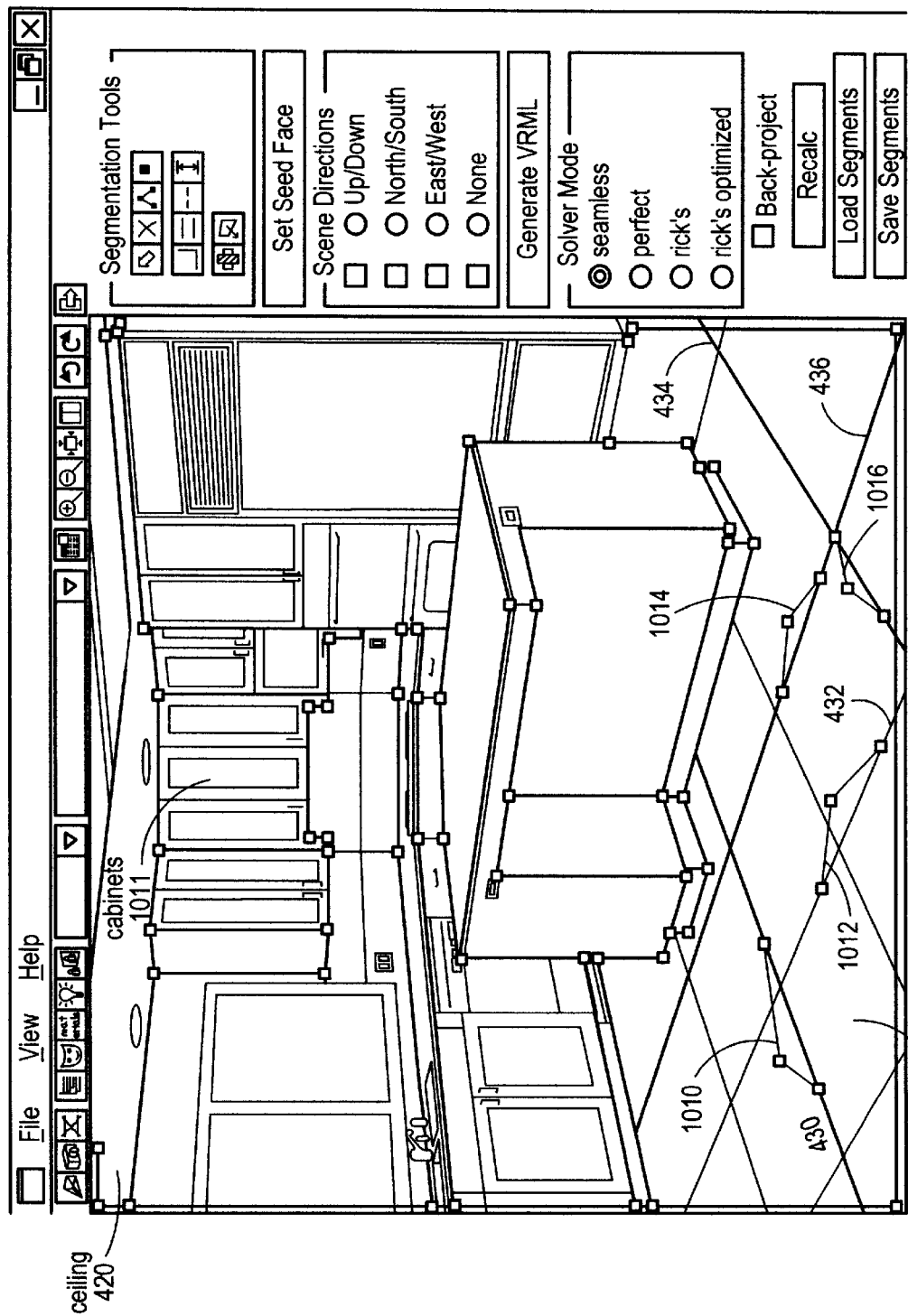
FIG. 10 shows a user interface with an image of a scene and surface patterns marked.

FIG. 10 shows a user interface with an image of a scene and surface patterns marked. Cabinets 1011 are shaded bright green to indicate that the system needs additional constraints. Ceiling 420 had not been fully constrained, but once ceiling 420 is constrained the geometry will be fixed and the color of the cabinets will change. This illustrates the way that geometry can be propagated over the scene. Surface pattern on floor 410 includes grout lines between tiles, grout lines being designated by reference numbers 430, 432, 434, and 436. Triangles (1010, 1012, 1014, and 1016) have been drawn by a user to designate the location of the surface pattern. For example, triangle 1010 indicates the orientation of grout line of 430. Similarly grout line 432 and triangle 1012, grout line 434 and triangle 1016, and grout line 436 and triangle 1014 are paired to indicate the orientation of the pattern.

Although triangle shapes are shown marking the patterns, alternative ways exist to specify constraints on patterns. For example, lines created by a user could be used to indicate patterns. Other graphical indications, generated by user selection or generated automatically, may be used to specify indicate locations or orientations of patterns. Other indications that do not appear on the user interface, such as internally stored parameters, could also be used to designate patterns. The system may use as constraints relationships between patterns and surfaces, relationships between patterns and other patterns, or other relationships between patterns and other features of the image.

User Interface with Additional Constraints

Figure 11:
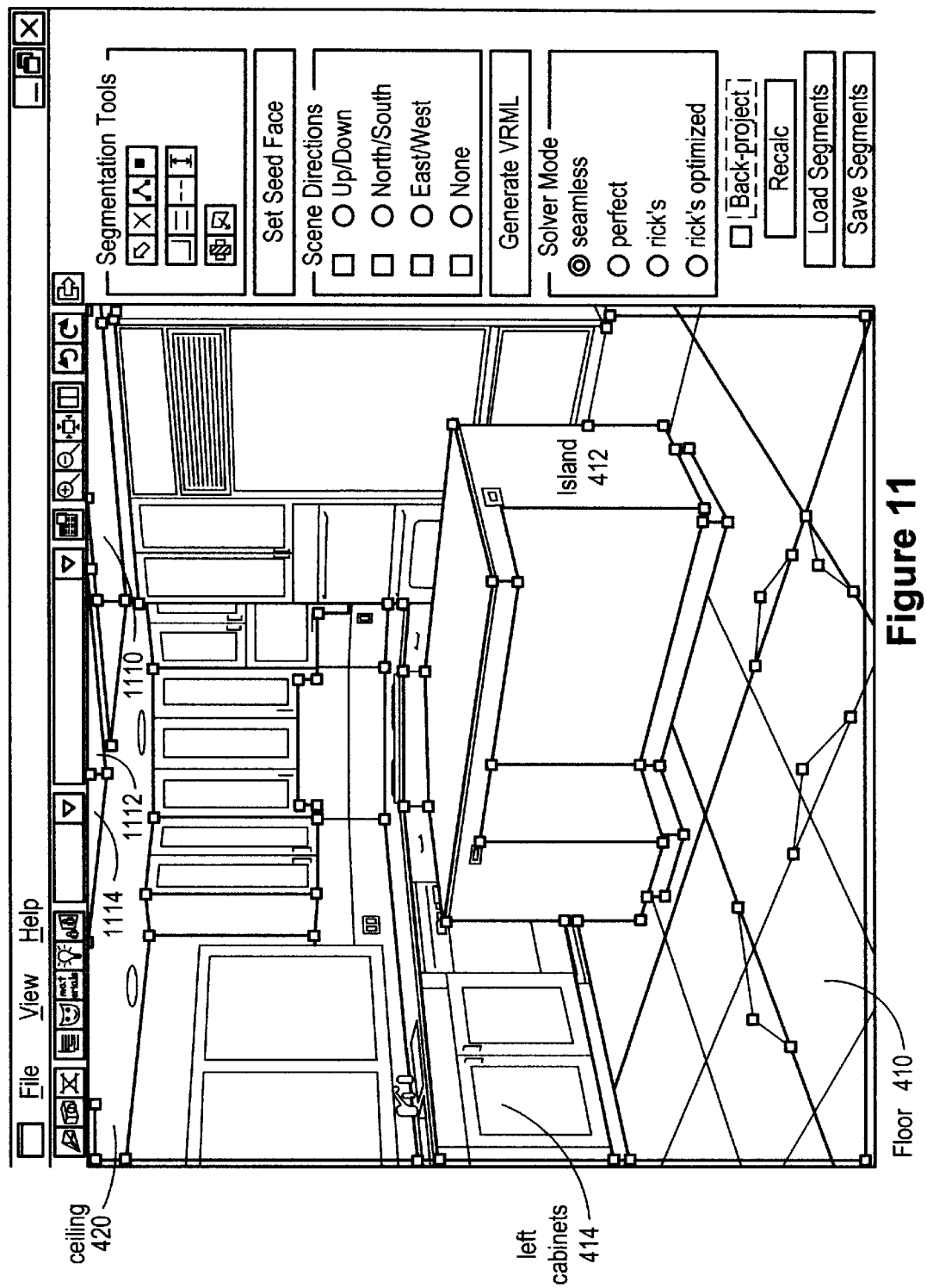
FIG. 11 shows the user interface with an image of the scene and additional constraints.

FIG. 11 shows the user interface with an image of the scene and additional constraints. Additional segmentation lines 1110, 1112, and 1114 have been added to more fully define the ceiling 420 with the addition of these constraints, the system is more capable of solving for the three dimensional model and this is indicated by the fact that the surfaces are now all colored yellow instead of green.

Surface patterns that can be used to increase the number of constraints provided to the system include items such as tile grout lines, wallpaper patterns, paint, or other markings on walls, cabinets, floor, or other surfaces. To designate such a pattern the user draws a line on the surface, where the line corresponds to a pattern on the surface. For example, the user draws triangle 1010, which has a base along grout line 430. The system records the x and y position of the endpoints of the line on the image. The user associates the line with the floor, indicating that the line is coplanar with the floor. Then, the user can indicate constraints between the pattern and other aspects of the image. For example, the user may indicate that grout line 430 as designated by triangle 1010 is parallel to left cabinets 414. Alternatively, the user may indicate that grout line 436, as designated by triangle 1014, is perpendicular to left cabinets 414. The user can also indicate constraints such as distance between patterns or distance between patterns and surfaces or other aspects of the image. As an alternative to the triangles shown, other user interface techniques may be used such as simply designating the pattern with a line.

Based on the additional constraints, including the constraints related to surface patterns, the solver is rerun and a new three dimensional model is created. This new three dimensional model can then be reprojected onto a two dimensional image or displayed in a browser to allow a three dimensional manipulation of the model.

User Interface with Reprojected View

Figure 12:
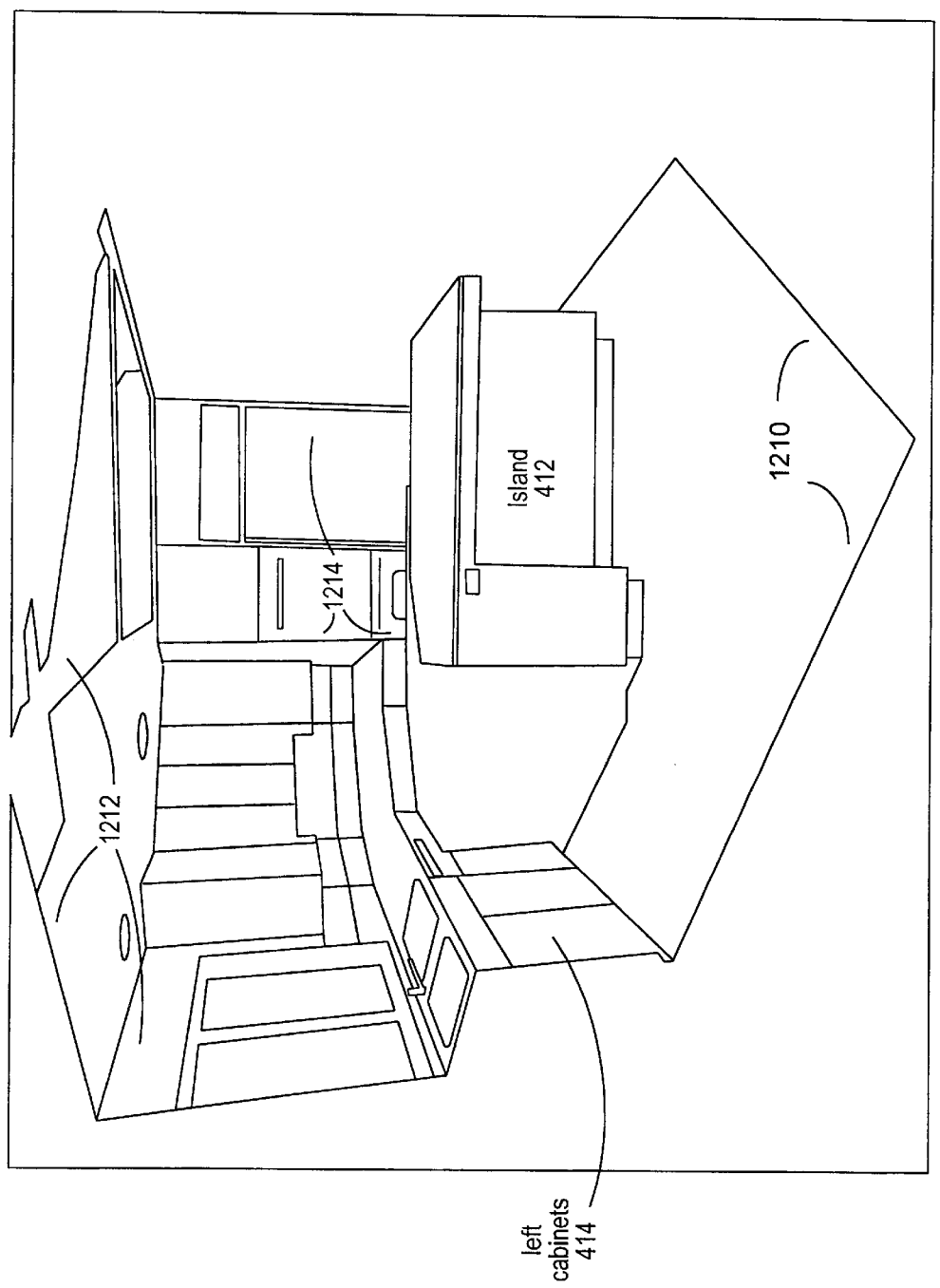
FIG. 12 shows the user interface with an image of the scene that was created with the three dimensional model and which is displayed from a different vantage point.

FIG. 12 shows the user interface with an image of the scene that was created with the three dimensional model and which is displayed from a different vantage point. The image shown in FIG. 12 is projected as a two dimensional image from the three dimensional model. Note that island 412 is now oriented more squarely towards the view. Also, some portions of the image are not drawn (reference numbers 1210, 1212, and 1214) because they were associated with occluded portions of the original image and thus were not fully defined.

User Interface with New Pattern

Figure 13:
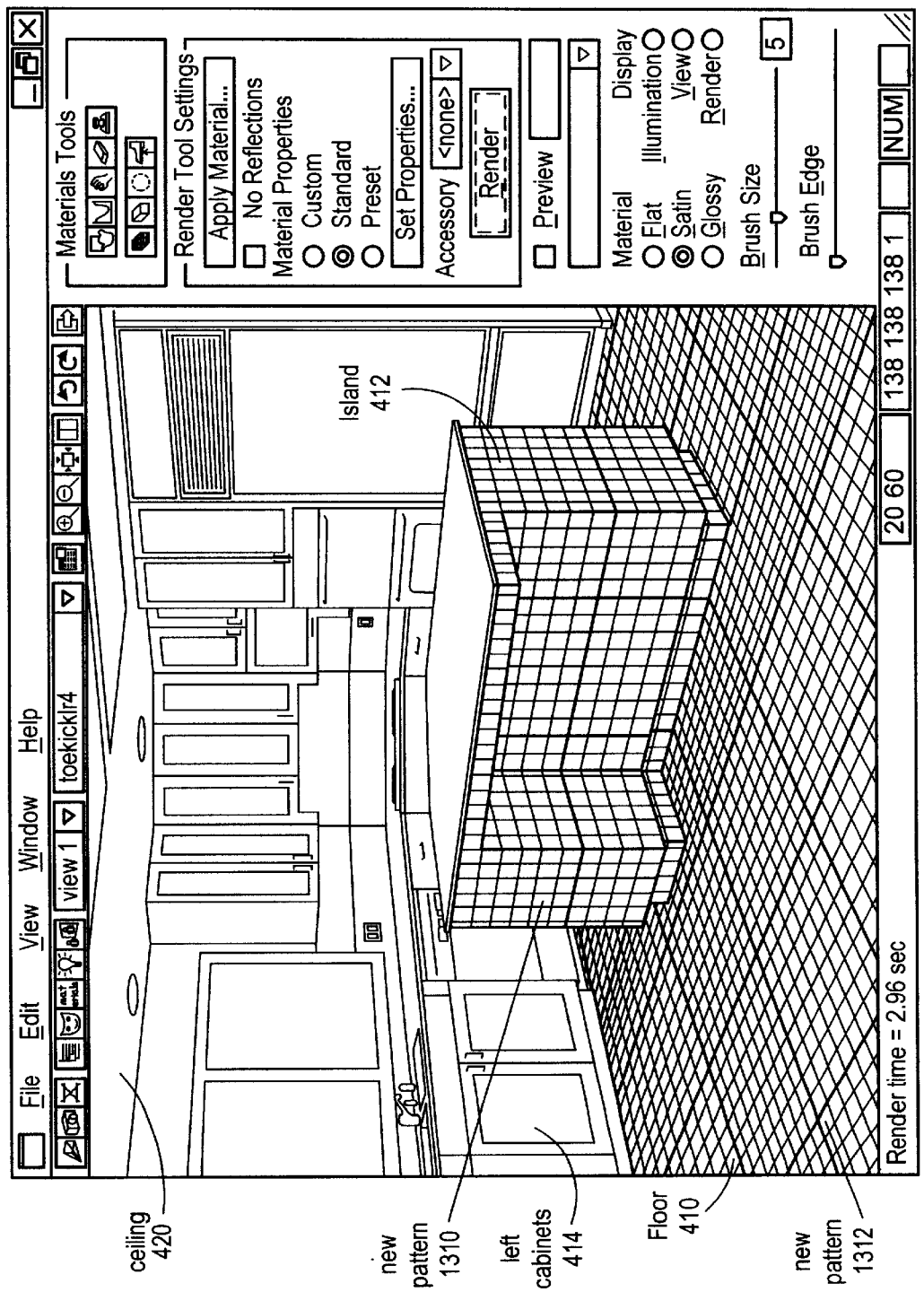
FIG. 13 shows a user interface with an image of a scene with a new surface pattern.

FIG. 13 shows a user interface with an image of a scene with a new surface pattern. New pattern 310 is shown on island 412 and new pattern 312 is shown on floor 410. Using surface patterns in the creation of the three dimensional model of the scene helps to improve the reprojection of the scene onto a two dimensional model, especially with respect to projection of a new pattern onto the scene.

Alternative Embodiments

Designation of various items in the image may be automated. For example, in one embodiment the system automatically determines and designates edges between surfaces. In one embodiment, the system automatically detects surface patterns such as grout lines or wallpaper patterns. Also, based on information in the image, the system may automatically determine constraints between surfaces and other elements of the image. Where surfaces are occluded and not much information exists regarding the occluded surface, the system may automatically infer the character of the occluded surface and produce an image representing that surface when the model is reprojected and that surface is exposed. For example, the system may repeat portions of the image near the occluded portion over the occluded portion.

Further, the order of entry of constraints and creation of models may vary. For example, constraints including surface patterns may be determined before the creation of any camera or scene model.

Embodiments of the present invention may be used to create three dimensional models of scenes based on a single photograph, or based on multiple photographs or images.

In another embodiment of the invention, images from which the three dimensional model may include an artist's sketch, a computer generated image, or other image.

Further embodiments of the present invention, may be used to create three dimensional models of scenes based on multiple photographs in addition to based on simply one photograph.

Accordingly, a system and method for creating a three dimensional model based on a two dimensional image has been described. The system uses information from the image in combination with constraint information regarding orientations and relationships of surfaces. Additionally, the system obtains constraint information regarding patterns on surfaces. Using constraints, the system solves for a three dimensional model, which may be reprojected at a different orientation or with different patterns.

The foregoing description of embodiments of the invention, has been provided for the purposes of illustration and description. It is not intended to be exhaustive or to limit the invention to the precise form disclosed. Many modifications and variations will be apparent. The embodiments were chosen and described in order to best explain the principles of the invention and its practical application, thereby enabling others to understand the invention for various embodiments and with various modifications as are suited to the particular use contemplated. It is intended that the scope of the invention be defined by the following claims and their equivalents.

What is claimed is:

1. A method of creating a three dimensional model of a scene based on a two dimensional image of the scene, the method comprising:
   identifying a plurality of surfaces in the image;
   identifying a plurality of constraints between the surfaces in the image;
   identifying a pattern on a first surface in the image;
   identifying a first constraint between the pattern and another feature of the image; and
   generating a three dimensional model of the scene based on the surfaces, the plurality of constraints, and the first constraint.

2. The method of claim 1, wherein identifying a pattern includes identifying a grout line in a tile surface.

3. The method of claim 1, wherein identifying a pattern includes identifying a mark on a wall paper.

4. The method of claim 1, wherein the another feature comprises a surface.

5. The method of claim 1, wherein the another feature comprises a second pattern.

6. The method of claim 1, identifying a plurality of surfaces in the image comprising:
   drawing lines on an image, the lines corresponding to edges of a surface.

7. The method of claim 1, the plurality of constraints comprising a perpendicular relationship between a second surface in the image and a third surface in the image.

8. The method of claim 1, the plurality of constraints comprising a parallel relationship between a second surface in the image and a third surface in the image.

9. The method of claim 1, the plurality of constraints comprising a distance relationship between a second surface in the image and a third surface in the image.

10. The method of claim 9, the plurality of constraints comprising a parallel relationship between a second surface in the image and a third surface in the image.

11. The method of claim 1, the plurality of constraints comprising an angular relationship between a second surface in the image and a third surface in the image.

12. The method of claim 1, the first constraint comprising a perpendicular relationship between the pattern and the another feature of the image.

13. The method of claim 1, the first constraint comprising a parallel relationship between the pattern and the another feature of the image.

14. The method of claim 1, the first constraint comprising a distance relationship between the pattern and the another feature of the image.

15. The method of claim 1, the first constraint comprising an angular relationship between the pattern and the another feature of the image.

16. The method of claim 1, wherein generating the three dimensional model comprises:
   identifying a second surface in the image;
   generating a first three dimensional representation of the second surface;

generating a second three dimensional representation of a third surface based on the first three dimensional representation and a constraint between the second surface and the third surface; and repeatedly generating three dimensional representations of surfaces based on generated representations of surfaces and constraints between surfaces.

17. The method of claim 1, wherein identifying a pattern on a first surface in the image comprises:

receiving a user input corresponding to a line drawn by a user, the line corresponding to the pattern; and the user identifying a coplanar relationship between the pattern and a first surface.

18. The method of claim 1, wherein identifying a pattern on a first surface in the image comprises:

automatically identifying a direction corresponding to the pattern; and automatically identifying a coplanar relationship between the pattern and a first surface.

19. The method of claim 1, comprising generating a second image based on the three dimensional model.

20. A method of creating a three dimensional model of a scene based on a two dimensional image of the scene, the method comprising:

generating a camera model based on vanishing points determined from the image;

identifying a plurality of constraints between surfaces in the image;

generating a first three dimensional model based on the constraints and the camera model;

identifying a first constraint between the pattern and a first surface in the image;

generating a second three dimensional model of the scene based on the surfaces, the plurality of constraints, and the first constraint.

21. The method of claim 20, generating a first three dimensional model comprising:

identifying a second surface in the image;

generating a first three dimensional representation of the second surface;

generating a second three dimensional representation of a third surface based on the first three dimensional representation and a constraint between the second surface and the third surface; and repeatedly generating three dimensional representations of surfaces based on generated representations of surfaces and constraints between surfaces.

22. The method of claim 21, identifying a first surface in the image comprising identifying a surface corresponding to a floor in the scene.

23. The method of claim 21, the three dimensional representation of the first surface comprising a three dimensional vector.

24. The method of claim 20, comprising:

determining an error in the three dimensional model based on constraints in the plurality of constraints; and adjusting the model to reduce the error.

25. The method of claim 20, wherein generating the three dimensional model comprises:

weighing the first constraint between the pattern and a first surface in the image more heavily than at least one other constraint in the plurality of constraints in order to cause a second image generated from the three dimensional model to tend to display a second pattern correctly.

26. The method of claim 20, wherein generating the three dimensional model comprises:

using a subset of the constraints in order to increase processing speed of the generating.

27. A method of creating a three dimensional model of a scene based on an image of the scene, the method comprising:

identifying at least a first surface and a second surface in the scene;

identifying a first geometric relationship between the first surface and the second surface;

identifying a pattern in the first surface;

identifying a second geometric relationship between the pattern and another feature of the image; and generating a camera model based on the image;

generating a three dimensional model of the scene based on the model of the camera, the first geometric relationship, and the second geometric relationship.

28. The method of claim 27, generating a camera model comprising:

identifying mutually orthogonal sets of lines that appear parallel in the scene represented by the image;

determining vanishing points based on the mutually orthogonal sets of lines;

generating a model based on the vanishing points.

29. The method of claim 28, wherein generating a camera model comprises:

determining a focal length; and determining an image center.

30. The method of claim 28, wherein generating a camera model comprises:

determining a distance between a third surface and a camera by which the image may have been generated; and determining a three dimensional model orientation.

31. The method of claim 28, wherein generating a camera model comprises:

determining a focal length;

determining an image center;

determining a distance between the camera by which the image was generated; and determining a three dimensional model orientation.

32. The method of claim 27, wherein generating a camera model comprises:

receiving a user input from a menu of cubes, the cubes corresponding to possible scene orientations.

33. The method of claim 27, comprising:

generating a second image based on the three dimensional model.

34. The method of claim 33, comprising:

displaying a second pattern in the first surface on the second image based on the three dimensional model.

35. The method of claim 27, comprising:

providing an indication to a user that sufficient constraints have been identified to create a three dimensional model of the scene.

36. The method of claim 27, comprising:

generating a three dimensional model;

determining an error in the three dimensional model based on constraints; and providing the indication to the user based on the error.

37. The method of claim 27, wherein providing an indication comprises:

coloring a surface in the image.

38. A computer program product, comprising:
a computer usable medium having a computer readable program code embodied therein for causing a computer to create a three dimensional model of a scene based on a two dimensional image of the scene, the computer readable program code comprising:
   computer readable program code that identifies a plurality of surfaces in the image;
   computer readable program code that identifies a plurality of constraints between the surfaces in the image;
   computer readable program code that identifies a pattern on a first surface in the image;
   computer readable program code that identifies a first constraint between the pattern and a feature of the image; and
   computer readable program code that generates a three dimensional model of the scene based on the surfaces, the plurality of constraints, and the first constraint.

39. The computer program product of claim 38, wherein code that generates the three dimensional model comprises:
   code that identifies a second surface in the image;
   code that generates a first three dimensional representation of the second surface;
   code that generates a second three dimensional representation of a third surface based on the first three dimensional representation and a constraint between the second surface and the third surface; and
   code that repeatedly generates three dimensional representations of surfaces based on generated representations of surfaces and constraints between surfaces.

40. The computer program product of claim 38, wherein code that identifies a pattern on a first surface in the image comprises:
   code that automatically identifies a direction corresponding the pattern; and
   code that automatically identifies a coplanar relationship between the pattern and the first surface.

* * * * *